United States Patent
Fujita

(10) Patent No.: US 7,900,668 B2
(45) Date of Patent: Mar. 8, 2011

(54) PNEUMATIC TIRE WITH TREAD INCLUDING GENTLY SLANT GROOVES HAVING TWO DIFFERENT INCLINATION ANGLES

(75) Inventor: Shungo Fujita, Kunitachi (JP)

(73) Assignee: Bridgestone Corporation, Tokyo (JP)

( * ) Notice: Subject to any disclaimer, the term of this patent is extended or adjusted under 35 U.S.C. 154(b) by 1120 days.

(21) Appl. No.: 11/637,029

(22) Filed: Dec. 12, 2006

(65) Prior Publication Data

US 2007/0131324 A1    Jun. 14, 2007

(30) Foreign Application Priority Data

Dec. 14, 2005    (JP) ................. 2005-360701

(51) Int. Cl.
*B60C 11/11* (2006.01)
*B60C 11/12* (2006.01)

(52) U.S. Cl. .......... 152/209.18; 152/209.28; 152/DIG. 3

(58) Field of Classification Search ............ 152/209.2, 152/209.18, 209.28, DIG. 3
See application file for complete search history.

(56) References Cited

U.S. PATENT DOCUMENTS

| | | | | |
|---|---|---|---|---|
| 4,545,415 A | * | 10/1985 | Lindner et al. | 152/902 |
| 2002/0062892 A1 | * | 5/2002 | Himuro | 152/209.18 |
| 2007/0215258 A1 | * | 9/2007 | Fukunaga | 152/209.18 |

FOREIGN PATENT DOCUMENTS

| | | | |
|---|---|---|---|
| JP | 61-271104 | * | 12/1986 |
| JP | 04-050006 | * | 2/1992 |
| JP | 5-286312 A | | 11/1993 |
| JP | 06-048117 | * | 2/1994 |
| JP | 07-290907 | * | 11/1995 |
| JP | 2003-326918 | * | 11/2003 |
| JP | 2004-168189 | * | 6/2004 |

OTHER PUBLICATIONS

Machine translation for Japan 2003-326918 (no date).*
Machine translation for Japan 07-290907 (no date).*
Machine translation for Japan 06-048117 (no date).*
Machine translation for Japan 05-286312 (no date).*

* cited by examiner

*Primary Examiner* — Steven D Maki
(74) *Attorney, Agent, or Firm* — Sughrue Mion, PLLC

(57) ABSTRACT

In a pneumatic tire having excellent drainage property and performances on snow, a central main groove 2 and a side main groove 4 and first and second gently slant grooves 5, 6 are arranged in a tread portion 1, and the first and second gently slant grooves 5, 6 are terminated in a central land portion 9 between the central main groove 2 and the side main groove 4, and first and second fine grooves 7, 8 are further arranged so as to extend from terminal ends 11, 12 of the first and second gently slant grooves 5, 6 toward the central main groove 2 and open thereto, respectively.

9 Claims, 3 Drawing Sheets

Comparative Example

PNEUMATIC TIRE WITH TREAD INCLUDING GENTLY SLANT GROOVES HAVING TWO DIFFERENT INCLINATION ANGLES

BACKGROUND OF THE INVENTION

1. Field of the Invention

This invention relates to a so-called all-weather type pneumatic tire considering performances in a winter season.

2. Description of the Related Art

The all-weather tire is an all-purpose tire capable of running not only on dry and wet road surfaces but also on ice and snow road surfaces. Such a tire is common to have a block pattern formed by arranging on a tread portion straight or zigzag main grooves extending in a circumferential direction of the tire and a plurality of slant grooves crossing these main grooves.

As a means for improving the drainage property, it is useful to take a method of increasing a ratio of groove area or so-called negative ratio by widening a groove width of the each groove. However, there is a problem that as the negative ratio is made large, the rigidity of land portion lowers and hence the satisfactory steering stability is not obtained.

As to the drainage property, the main groove extending in the circumferential direction of the tire develops an effect of draining water in a forward-backward direction of the tire, while the slant groove develops an effect of draining water toward a side of the tire.

As a means for establishing the drainage property and the traction performance on snow in a balanced manner, it is useful to adopt a so-called high-angle groove wherein a groove portion of the slant groove located at a central zone of the tread is extended at a relatively small angle with respect to the circumferential direction of the tire (i.e. as a steeply slant groove) to improve the drainage property and a groove portion located at a side zone of the tread is extended at a relatively large angle with respect to the circumferential direction (i.e. as a gently slant groove) to improve the traction performance on snow.

In a block pattern wherein the steeply slant groove is opened to the main groove located at the central zone, however, a corner part of the block defined between the central main groove and the steeply slant groove becomes acute-angled and the rigidity as a whole of land portions located at the central zone is generally insufficient, and hence the traction performance and steering stability can not be sufficiently ensured and also the uneven wearing is easily caused.

For this end, JP-A-H05-286312 discloses a pneumatic tire wherein the steeply slant groove (portion) is terminated in the land portion located short of the central main groove so as to satisfy both the steering stability and the drainage property (resistance to hydroplaning) at a higher level.

In case of the tread pattern wherein the steeply slant groove (portion) is terminated in the land portion located short of the central main groove as described in the above patent document, however, all of water taken in the central main groove from the central zone in the contacting with ground is drained only toward the forward-backward direction of the tire, so that the drainage property can not be said to be sufficient, and there is still left a room for improving the drainage property.

SUMMARY OF THE INVENTION

It is, therefore, an object of the invention to provide a pneumatic tire, particularly an all-weather type pneumatic tire in which excellent drainage property and performances on snow are developed without deteriorating the other performances and the uneven wearing is hardly caused by appropriating first and second gently slant grooves located between the central main groove and the side main groove and arranging given fine grooves between terminal ends of these gently slant grooves and the central main groove.

In order to achieve the above object, the invention lies in a pneumatic tire comprising a tread portion in which a central main groove extending in a circumferential direction of the tire is located in an equator of the tire or in the vicinity thereof, and a side main groove extending in the circumferential direction of the tire is located between the central main groove and a tread end, and gently slant grooves each inclining at a relatively large angle with respect to the circumferential direction of the tire are extended from the tread end toward the equator of the tire, and said gently slant grooves comprise first and second gently slant grooves having two different inclination angles and these first and second gently slant grooves are alternately arranged at predetermined intervals in the circumferential direction of the tire and the inclination angle of the first gently slant groove is made larger than that of the second gently slant groove, wherein the first and second gently slant grooves are terminated in a central land portion located between the central main groove and the side main groove, respectively, and first and second fine grooves are further arranged so as to extend from terminal ends of the first and second gently slant grooves toward the central main groove and open thereto, respectively.

In a preferable embodiment of the invention, each of the first and second fine grooves is existent on an extension in the extending direction of each of the first and second gently slant grooves.

In another preferable embodiment of the invention, a steeply slant groove is further arranged so as to extended between the terminal end of the first gently slant groove and the terminal end of the second gently slant groove and open to these terminal ends. In this case, the steeply slant groove is more preferable to extend from the second gently slant groove to the first gently slant groove in a direction of separating from the equator of the tire.

In the other preferable embodiment of the invention, the first fine groove communicated with the second fine groove at a position of the central main groove.

In a further preferable embodiment of the invention, each of plural blocks constituting a side land portion located between the side main groove and the tread end has a ground contacting area within a range of ±15% of an average value of a ground contacting area on all blocks.

In a still further preferable embodiment of the invention, among a plurality of central blocks constituting a central land portion defined by two first gently slant grooves adjacent to each other in the circumferential direction of the tire, a ground contacting area of a central block having a maximum ground contacting area is made smaller than two times of a ground contacting area of a central block having a minimum ground contacting area.

In a yet further preferable embodiment of the invention, a plurality of central blocks constituting a central land portion defined by two first gently slant grooves adjacent to each other in the circumferential direction of the tire are constituted with a first segment block of substantially a triangular form defined by the first and second gently slant grooves and the first and second fine grooves, a second segment block defined by the central main groove, the steeply slant groove and the first and second fine grooves, and a third segment block defined by the side main groove, the steeply slant groove and the first and second gently slant grooves.

In another preferably embodiment of the invention, a groove width of a groove portion located at the side land portion in the first and second gently slant grooves is wider than a groove width of a groove portion located at the central land portion.

In a further preferable embodiment of the invention, at least one of the first and second gently slant grooves is obliquely extended in such a direction that an angle with respect to the circumferential direction of the tire is made small from the tread end toward the central main groove.

In a still further preferable embodiment of the invention, a shift length in the circumferential direction between an extension of a groove width center line in a groove portion located at the side land portion and an extension of a groove width center line in a groove portion located at the central land portion in the first and second gently slant grooves is not more than 5 mm at a position of a groove width center line of the side main groove.

According to the invention, there can be provided a pneumatic tire, particularly an all-weather type pneumatic tire in which excellent drainage property and performances on snow are developed without deteriorating the other performances and the uneven wearing is hardly caused by appropriating first and second gently slant grooves located between the central main groove and the side main groove and arranging given fine grooves between terminal ends of these gently slant grooves and the central main groove.

BRIEF DESCRIPTION OF THE DRAWINGS

The invention will be described in detail with reference to the accompanying drawings, wherein.

DETAILED DESCRIPTION OF THE INVENTION

Figure 1:
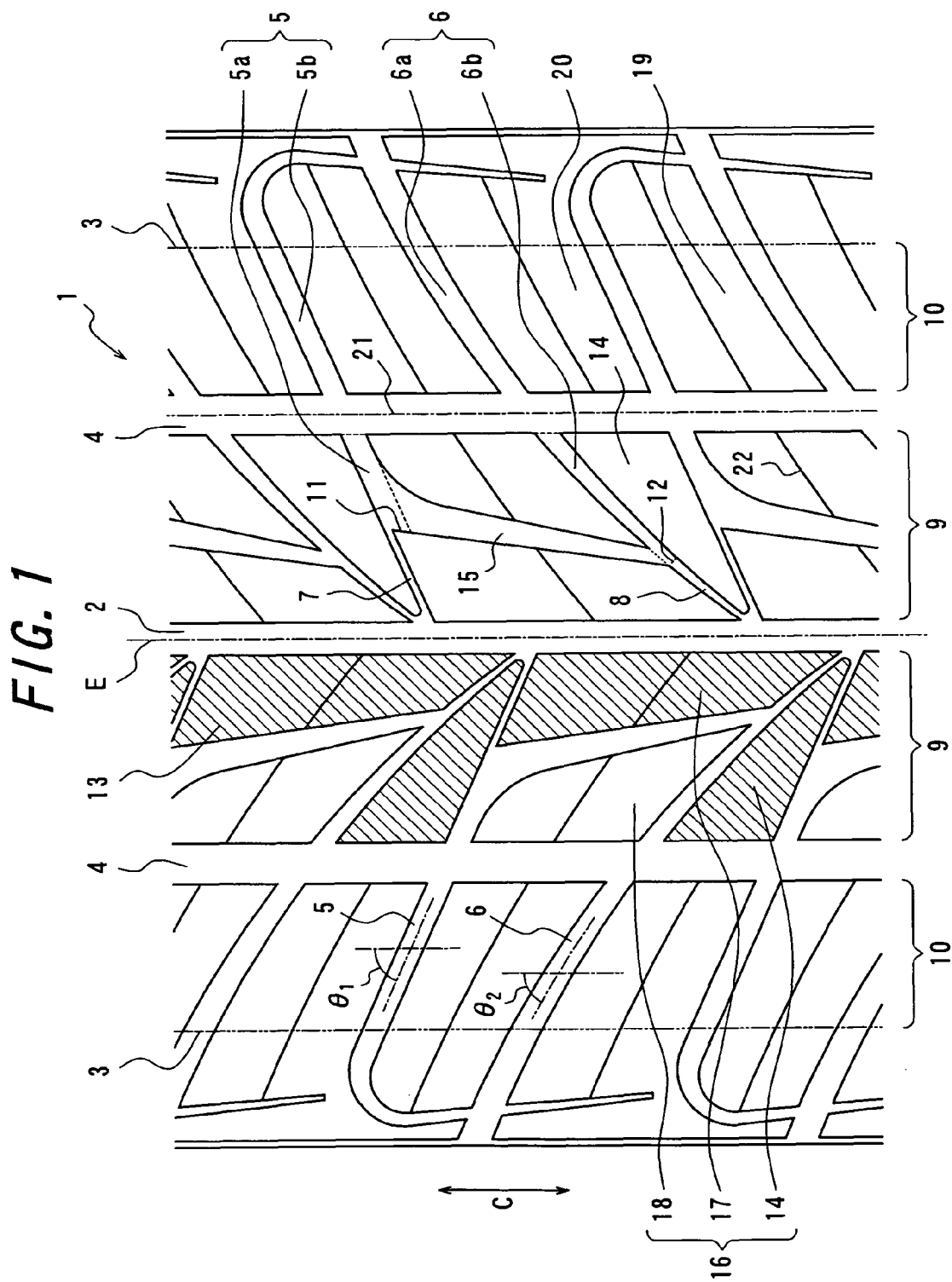
FIG. 1 is a developed view of a part of a tread portion in the pneumatic tire according to the invention.

FIG. 1 shows a part of a tread pattern in the pneumatic tire according to the invention.

In the pneumatic tire having a tread portion 1 shown in FIG. 1, a central main groove 2 extending in a circumferential direction C of the tire is located in an equator E of the tire or in the vicinity thereof at the tread portion 1, and a side main groove 4 extending in the circumferential direction C of the tire is located between the central main groove 2 and a tread end 3, and gently slant grooves each inclining at a relatively large angle with respect to the circumferential direction C of the tire are extended from the tread end 3 toward the equator E of the tire.

The arranging position of the central main groove 2 is within a width region centering on the equator of the tire corresponding to 10% of a tread width.

Also, the gently slant grooves comprise a first gently slant groove 5 and a second gently slant groove 6 having two different inclination angles, in which an angle $\theta_1$ of the first gently slant groove 5 with respect to the circumferential direction C is larger than an angle $\theta_2$ of the second gently slant groove 6 with respect to the circumferential direction C. These first and second gently slant grooves 5, 6 are alternately arranged at predetermined intervals in the circumferential direction C of the tire.

The angle $\theta_1$ of the first gently slant groove 5 is preferable to be 70-50°, and the angle $\theta_2$ of the second gently slant groove 6 is preferable to be 70-25°.

A main feature in the construction of the invention lies in that a groove portion 5a of the first gently slant groove 5 and a groove portion 6a of the second gently slant groove 6 located between the central main groove 2 and the side main groove 4 are rationalized and given fine grooves 7, 8 are arranged between the gently slant grooves 5, 6 and the central main groove 2. More concretely, the first and second gently slant grooves 5, 6 are terminated in a central land portion 9 located between the central main groove 2 and the side main groove 4, respectively, while first and second fine grooves 7, 8 are further arranged so as to extend from terminal ends 11, 12 of the first and second gently slant grooves 5, 6 toward the central main groove 2 and open thereto, respectively.

That is, the first and second gently slant grooves 5, 6 are terminated in the central land portion 9 located between the central main groove 2 and the side main groove 4 so as not to open these gently slant grooves to the central main groove 2, whereby a rib-shaped land portion 13 continuing in the circumferential direction C (shadow portion in FIG. 1) can be left on at least a part of the central land portion 9 located between the central main groove 2 and the side main groove 4 while ensuring the traction performance, and hence the rigidity of the whole of the central land portion 9 can be ensured sufficiently.

Also, the first and second fine grooves 7, 8 are arranged so as to open from the terminal ends 11, 12 of the first and second gently slant grooves 5, 6 to the central main groove 2, respectively, whereby water inside the central main groove 2 can be distributed through the first and second fine grooves 7, 8 to the first and second gently slant grooves 5, 6 to enhance the drainage ability toward the side of the tire. Further, at least parts of opposed groove walls in the first fine groove 7 and the second fine groove 8 can be contacted with each other in the contacting with ground to leave a rib-shaped land portion substantially continuing in the circumferential direction C on at least a part of the central land portion 9, and hence the securement of the rigidity in the central land portion 9 and the suppression of uneven wearing can be established.

Figure 3:
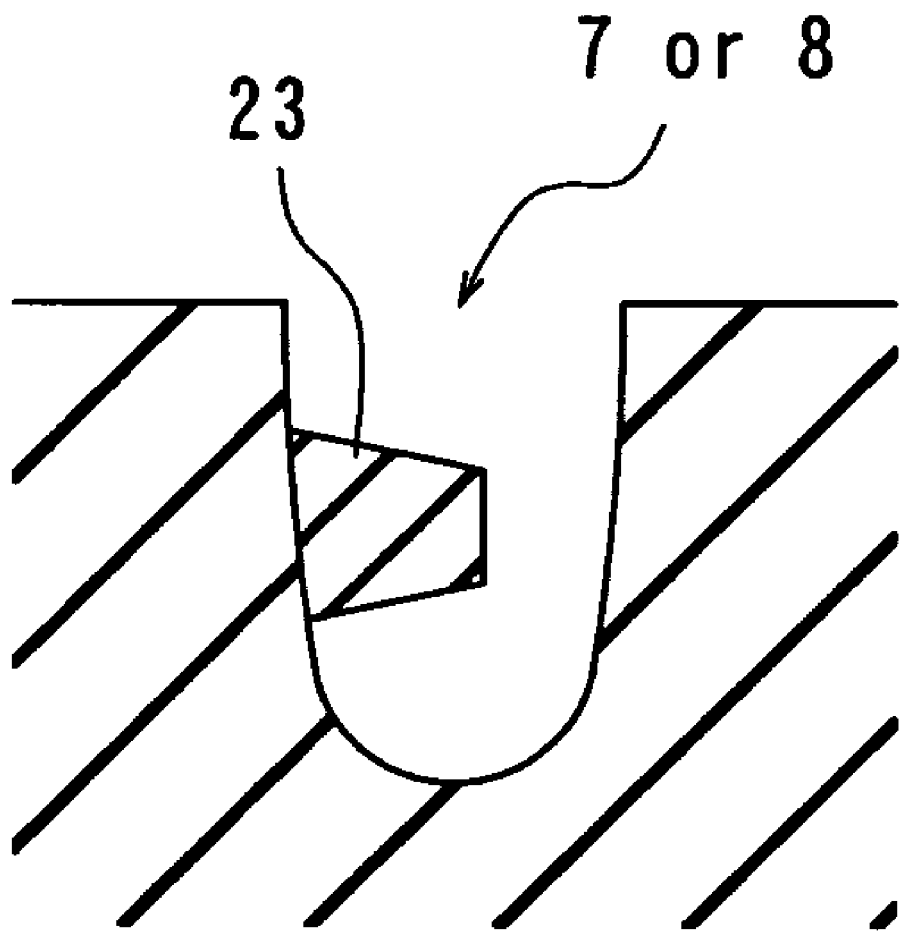
FIG. 3 is a section view in a widthwise direction of a groove illustrating another embodiment of a first or second fine groove.

At this moment, the first and second fine grooves 7, 8 are required to have such a groove width that water in the central main groove 2 can be distributed into the first and second gently slant grooves 5, 6 and at least parts of the opposed groove walls in each of the first and second fine grooves 7, 8 are contacted with each other in the contacting with ground. Concretely, each of the first and second fine grooves 7, 8 has such a groove width that at least parts of the opposed groove walls in each of the first and second fine grooves 7, 8 are contacted with each other under conditions of a maximum air pressure and a load capacity corresponding to 80% of a maximum load capacity defined in JATMA. For example, the groove width of each of the first and second fine grooves 7, 8 is preferable to be within a range of 1-2.5 mm. When the groove width is less than 1 mm, the opposed groove walls in each of the first and second fine grooves 7, 8 are completely contacted with each other to close the groove, and hence water inside the central main groove 2 can not be sufficiently distributed into the first and second gently slant grooves 5, 6. While, when it exceeds 2.5 mm, the opposed groove walls in each of the first and second fine grooves 7, 8 are not contacted with each other in the contacting with ground and the rigidity of the central land portion 9 can not be ensured. Moreover, if a projection height corresponding to 60-80% of the groove width, preferably a height of 3-4 mm is arranged on the groove wall of the first and second fine groove 7, 8 as shown in FIG. 3, it is possible to render the groove width of the fine groove into 5 mm at maximum.

Also, each of the first and second fine grooves is extended on an extension in the existing direction of each of the first and second gently slant grooves 5, 6, whereby water inside the central main groove 2 can be distributed through the first and second fine grooves 7, 8 to the first and second gently slant grooves 5, 6 to more enhance the drainage ability toward the side of the tire. In addition, a region defined by the side main groove 4, the first and second gently slant grooves 5, 6 and the first and second fine grooves 7, 8 is rendered into a first segment block 14 of substantially a triangular or trapezoidal form, whereby an edge component can be effectively increased while ensuring the block rigidity.

In the invention, it is preferable to further arrange a steeply slant groove 15 so as to extend from the terminal end 11 of the first gently slant groove 5 to the terminal end 12 of the second gently slant groove 6 and open to these terminal ends. That is, by arranging the steeply slant groove 15, a plurality of central blocks 16 constituting a part of the central land portion 9 defined by the two first gently slant grooves 5 adjacent to each other in the circumferential direction C are constructed with a first segment block 14 of substantially a triangular form defined by the first and second gently slant grooves 5, 6 and the first and second fine grooves 7, 8, a second segment block 17 defined by the central main groove 2, the steeply slant groove 15 and the first and second fine grooves 7, 8, and a third segment block 18 defined by the side main groove 4, the steeply slant groove 15 and the first and second gently slant grooves 5, 6, and hence the rigidity difference due to the non-uniformity of the size among the segment blocks 14, 17, 18 constituting the central land portion can be mitigated to suppress the uneven wearing and conduct the smooth drainage toward the first gently slant groove 5.

The steeply slant groove 15 is arranged so as to extend from the second gently slant groove 6 toward the first gently slant groove 5 in a direction of separating from the equator E of the tire, whereby the ability of draining water in the central land portion 9 contacted with the ground through the first gently slant groove 5 toward the side of the tire can be enhanced.

Also, when the first fine groove is communicated with the second fine groove 8 at a position of the central main groove 2, the water flowing directionality can be increased to two directions of the first and second gently slant grooves 5, 6 to more enhance the drainage property.

Furthermore, it is preferable that each of plural side blocks 19 and 20 constituting a side land portion 10 located between the side main groove 4 and the tread end 3 has a ground contacting area within a range of ±15% of an average value of a ground contacting area on all blocks in view of mitigating a block rigidity difference and suppressing the uneven wearing. Moreover, the term "average value" used herein means a percentage by dividing a total ground contacting area of all side blocks constituting the side land portion by the number of the side blocks.

Further, among a plurality of central blocks 14, 17, 18 constituting the central land portion 9 defined by two first gently slant grooves 5, 5 adjacent to each other in the circumferential direction C of the tire, it is preferable that a ground contacting area of a central block having a maximum ground contacting area is made smaller than two times of a ground contacting area of a central block having a minimum ground contacting area in view of mitigating a block rigidity difference and suppressing the uneven wearing.

In addition, it is more preferable that a groove width of a groove portion 5b, 6b located at the side land portion 10 in the first and second gently slant grooves 5, 6 is wider than a groove width of a groove portion 5a, 6a located at the central land portion 9 in view of smoothly flowing water in the draining toward the side of the tire to enhance the drainage property.

It is more preferable that at least one of the first and second gently slant grooves 5, 6 (only the second gently slant groove 6 in FIG. 1) is obliquely extended in such a direction that an angle with respect to the circumferential direction C of the tire is made small from the tread end 3 toward the central main groove 2 in view of establishing the drainage property and the traction performance at a central ground contacting area in a balanced manner.

In view of effectively reducing the pattern noise without damaging the drainage property in the gently slant grooves 5, 6, it is preferable that a shift length in the circumferential direction between an extension of a groove width center line in the groove portion 5b, 6b located at the side land portion 10 and an extension of a groove width center line in the groove portion 5a, 6a located at the central land portion 9 in the first and second gently slant grooves 5, 6 is not more than 5 mm at a position 21 of a groove width center line of the side main groove 4. The shift length is more preferably not more than 2 mm.

The above merely shows one embodiment of the invention, and various modifications can be added within a scope of the invention. For example, a widthwise sipe 22 may be arranged in each of the blocks as shown in FIG. 1 in order to effectively develop the suppression of the rigidity difference of the land portion and the edge effect on a snow road surface.

The following examples are given in illustration of the invention and are not intended as limitations thereof.

Example 1

There is prepared a pneumatic tire according to the invention having a tread pattern shown in FIG. 1, in which a tire size is 205/55R16 and a tread width is 180 mm, and a groove width, a groove depth and a groove angle with respect to a central main groove 2, a side main groove 4, a first gently slant groove 5, a second gently slant groove 6, a first fine groove 7, a second fine groove 8 and a steeply slant groove 15 are collectively shown in Table 1. Each of plural side blocks constituting a side land portion has a ground contacting area within a range of ±30% of an average value, and among a plurality of central blocks constituting a central land portion, a ground contacting area of a central block having a maximum ground contacting area is 1.1-2 times of a ground contacting area of a central block having a minimum ground contacting area. Also, a shift length in the circumferential direction between an extension of a groove width center line in the groove portion located at the side land portion and an extension of a groove width center line in the groove portion located at the central land portion in the first and second gently slant grooves is 5 mm at a position of a groove width center line of the side main groove. Moreover, the other tire construction is the same as in the conventional pneumatic radial tire for passenger cars.

TABLE 1

|  | Groove width (mm) | Groove depth (mm) | Groove angle (°) |
| --- | --- | --- | --- |
| Central main groove 2 | 10 | 8 | 0 |
| Side main groove 4 | 9 | 8 | 0 |
| First gently slant groove 5 | 6 | 6.5 | 66 |

TABLE 1-continued

|  | Groove width (mm) | Groove depth (mm) | Groove angle (°) |
|---|---|---|---|
| Second gently slant groove 6 | 2-7 | 6.5 | 37-66 |
| Steeply slant groove 15 | 4-8 | 6.5 | 8 |
| First fine groove 7 | 1.5 | 3.0 | 66 |
| Second fine groove 8 | 1.5 | 3.0 | 37-40 |

Comparative Example 1

Figure 2:
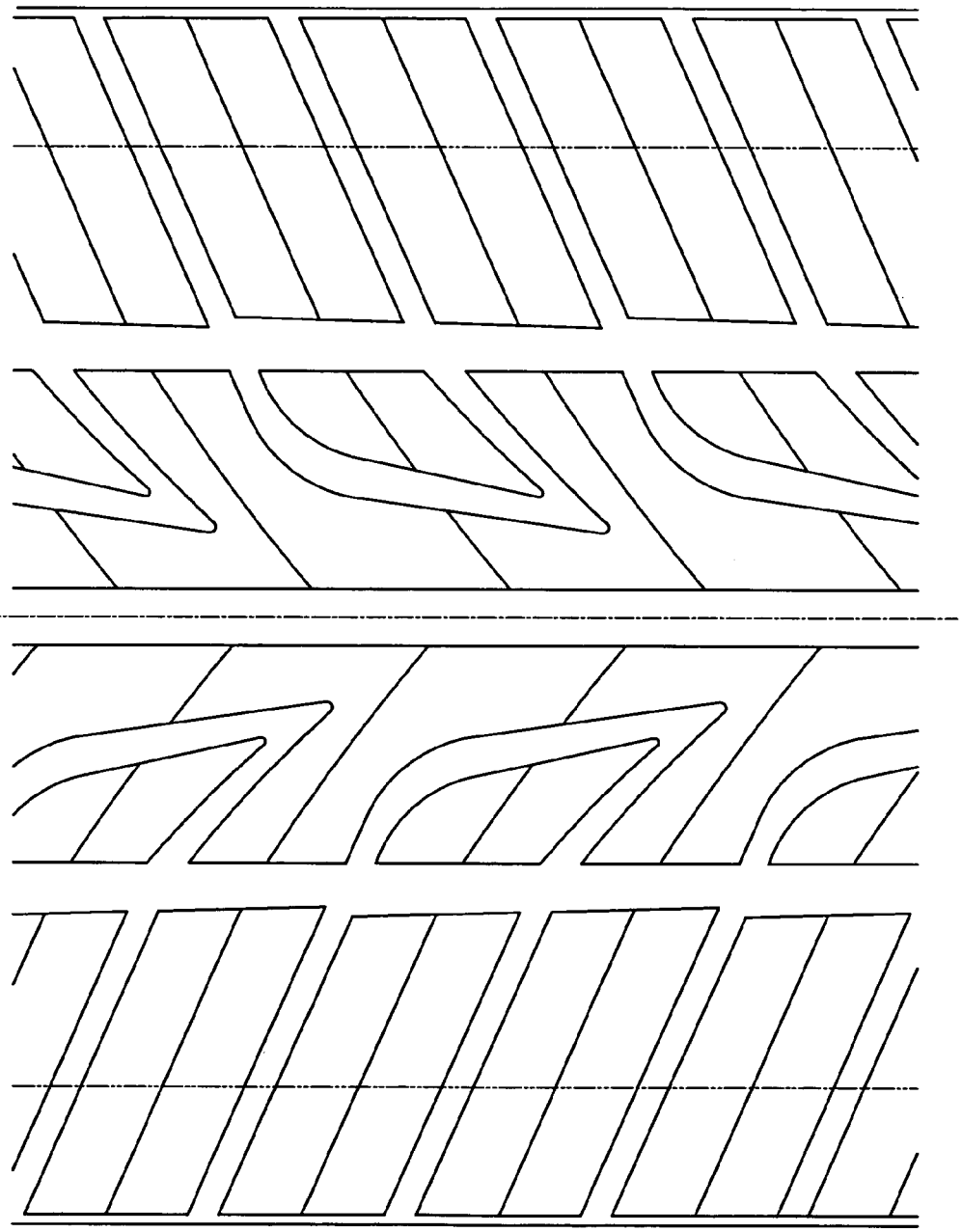
FIG. 2 is a developed view of a part of a tread portion used in a comparative example.

A tire of this comparative example has a tread pattern shown in FIG. 2, a tire size of 205/55R16 and a tread width of 180 mm, in which the groove width, groove depth and groove angle in the central main groove 2, side main groove 4, first gently slant groove 5, second gently slant groove 6 and steeply slant groove 15 are collectively shown in Table 2.

TABLE 2

|  | Groove width (mm) | Groove depth (mm) | Groove angle (°) |
|---|---|---|---|
| Central main groove 2 | 10 | 8 | 0 |
| Side main groove 4 | 9 | 8 | 0 |
| First gently slant groove 5 | 4-7 | 6.5 | 66 |
| Second gently slant groove 6 | 4-6 | 4-6.5 | 45 |
| Steeply slant groove 15 | 4-7 | 4-6.5 | 8 |

(Evaluation of Performances)

With respect to the above tires, the following tests are carried out under a tire internal pressure of 220 kPa and a tire load corresponding to two crewmen to evaluate the tire performances.

(1) Test for Evaluation of Drainage Property

The drainage property is evaluated by straight running on a wet road surface having a water depth of 5 mm to measure a limit speed causing a hydroplaning phenomenon.

(2) Test for Evaluation of Steering Stability on Snow

The steering stability on snow is evaluated by an overall feeling of a test driver on braking property, acceleration property, straight running property and cornering property when the tire is run on a test course of a compacted snow road surface at various running modes.

(3) Test for Evaluation of Traction Performance on Snow

The traction performance on snow is evaluated by fully accelerating on a compacted snow road surface to measure a time required for arriving at a distance of 50 m.

(4) Test for Evaluation of Braking Property on Snow

The braking property on snow is evaluated by fully braking on a compacted snow road surface from the running at a speed of 40 km/h to measure a braking distance.

(5) Test for Evaluation of Resistance to Uneven Wear

After the tire is run at a running mode assuming an expressway, a urban road and a mountain-sloping road over a distance of 5000 km, a tread surface of the tire is visually observed to measure a difference of land portion height between a leading side portion and a trailing side portion in a block for the evaluation of the resistance to uneven wear.

These evaluation results are shown in Table 3. Moreover, numerical values in Table 3 are represented by an index on the basis that Comparative Example 1 is 100, in which the larger the numerical value, the better the performance.

TABLE 3

|  | Comparative Example 1 | Example 1 |
|---|---|---|
| Drainage property | 100 | 115 |
| Steering stability on snow | 100 | 110 |
| Traction performance on snow | 100 | 115 |
| Braking property on snow | 100 | 100 |
| Resistance to uneven wear | 100 | 120 |

As seen from the results of Table 3, the example tire is excellent in the drainage property and performances on snow as compared with the comparative tire and suppresses the uneven wear.

According to the invention, it is possible to provide a pneumatic tire, particularly an all-weather type pneumatic tire in which excellent drainage property and performances on snow are developed without deteriorating the other performances and the uneven wearing is hardly caused by appropriating first and second gently slant grooves located between the central main groove and the side main groove and arranging given fine grooves between terminal ends of these gently slant grooves and the central main groove.

What is claimed is:

1. A pneumatic tire comprising a tread portion in which a central main groove extending in a circumferential direction of the tire is located in an equator of the tire or in the vicinity thereof, and a side main groove extending in the circumferential direction of the tire is located between the central main groove and a tread end, and gently slant grooves each inclining at a relatively large angle with respect to the circumferential direction of the tire are extended from the tread end toward the equator of the tire, and said gently slant grooves comprise first and second gently slant grooves having two different inclination angles and these first and second gently slant grooves are alternately arranged at predetermined intervals in the circumferential direction of the tire and the inclination angle of the first gently slant groove is made larger than that of the second gently slant groove, wherein the first and second gently slant grooves are terminated in a central land portion located between the central main groove and the side main groove, respectively, and first and second fine grooves are further arranged so as to extend from terminal ends of the first and second gently slant grooves toward the central main groove and open thereto, respectively, wherein a plurality of central blocks constituting a central land portion defined by two first gently slant grooves adjacent to each other in the circumferential direction of the tire are constituted with a first segment block of substantially a triangular form defined by the first and second gently slant grooves and the first and second fine grooves, a second segment block defined by the central main groove, a steeply slant groove and the first and second fine grooves, and a third segment block defined by the side main groove, the steeply slant groove and the first and second gently slant grooves.

2. A pneumatic tire according to claim 1, wherein each of the first and second fine grooves is existent on an extension in the extending direction of each of the first and second gently slant grooves.

3. A pneumatic tire according to claim 1, wherein the steeply slant groove is more preferable to extend from the second gently slant groove to the first gently slant groove in a direction of separating from the equator of the tire.

4. A pneumatic tire according to claim 1, wherein the first fine groove is communicated with the second fine groove at a position of the central main groove.

5. A pneumatic tire according to claim 1, wherein each of plural blocks constituting a side land portion located between the side main groove and the tread end has a ground contacting area within a range of +−15% of an average value of a ground contacting area on all blocks.

6. A pneumatic tire according to claim 1, wherein among the plurality of central blocks constituting a central land portion defined by the two first gently slant grooves adjacent to each other in the circumferential direction of the tire, a ground contacting area of a central block having a maximum ground contacting area is made smaller than two times of a ground contacting area of a central block having a minimum ground contacting area.

7. A pneumatic tire according to claim 1, wherein a groove width of a groove portion located at a side land portion in the first and second gently slant grooves is wider than a groove width of a groove portion located at the central land portion.

8. A pneumatic tire according to claim 1, wherein at least one of the first and second gently slant grooves is obliquely extended in such a direction that an angle with respect to the circumferential direction of the tire is made small from the tread end toward the central main groove.

9. A pneumatic tire according to claim 1, wherein a shift length in the circumferential direction between an extension of a groove width center line in a groove portion located at a side land portion and an extension of a groove width center line in a groove portion located at the central land portion in the first and second gently slant grooves is not more than 5 mm at a position of a groove width center line of the side main groove.

\* \* \* \* \*